United States Patent
Kouris et al.

(10) Patent No.: US 7,368,745 B2
(45) Date of Patent: May 6, 2008

(54) PATTERN RECOGNITION SYSTEM

(75) Inventors: Aristodimos Kouris, Willingham (GB); Christopher Reginald Chatwin, Near Lewes (GB)

(73) Assignee: University of Sussex (GB)

(*) Notice: Subject to any disclaimer, the term of this patent is extended or adjusted under 35 U.S.C. 154(b) by 256 days.

(21) Appl. No.: 10/504,771

(22) PCT Filed: Feb. 27, 2003

(86) PCT No.: PCT/GB03/00815

§ 371 (c)(1),
(2), (4) Date: May 23, 2005

(87) PCT Pub. No.: WO03/073366

PCT Pub. Date: Sep. 4, 2003

(65) Prior Publication Data

US 2005/0213096 A1  Sep. 29, 2005

(30) Foreign Application Priority Data

Feb. 27, 2002 (GB) .................................. 0204603.5

(51) Int. Cl.
*G02B 27/42* (2006.01)
*G01B 11/00* (2006.01)

(52) U.S. Cl. ..................................... 250/550; 356/388
(58) Field of Classification Search ............... 250/550; 356/388–392

See application file for complete search history.

(56) References Cited

U.S. PATENT DOCUMENTS

| | | | | |
|---|---|---|---|---|
| 3,543,237 A * | 11/1970 | Julesz et al. ................. | 382/211 |
| 4,621,329 A * | 11/1986 | Jacob ........................... | 701/222 |
| 5,206,499 A * | 4/1993 | Mantravadi et al. ....... | 250/203.6 |
| 5,528,702 A * | 6/1996 | Mitsuoka et al. ........... | 382/211 |
| 5,546,181 A * | 8/1996 | Kobayashi et al. ......... | 356/237.5 |
| 5,619,596 A * | 4/1997 | Iwaki et al. ................. | 382/278 |
| 5,770,850 A * | 6/1998 | Bowen et al. ............... | 250/203.1 |
| 6,504,602 B1 * | 1/2003 | Hinderling .................. | 356/5.1 |
| 6,525,879 B1 * | 2/2003 | Kawano et al. ............. | 359/559 |
| 2001/0040743 A1 * | 11/2001 | Graves et al. .............. | 359/849 |
| 2003/0184843 A1 * | 10/2003 | Moon et al. ................. | 359/290 |

\* cited by examiner

*Primary Examiner*—Thanh X. Luu
*Assistant Examiner*—Kevin Wyatt
(74) *Attorney, Agent, or Firm*—Vierra Magen Marcus & DeNiro LLP

(57) ABSTRACT

A star pattern recognition system (1) comprises an optical filter arrangement (10) in the form of an array (12) of independently tiltable mirrors (M1), (M2). Light from a distant starfield (2) is incident upon the mirror array (12). Each mirror (M1), (M2) reflects a respective image of the starfield, and these images are brought to a common overlapping focus at a detector (18) by a parabolic mirror (14). The mirrors M1, M2 are tilted relative to each other such that when a given star pattern to be recognised is present in the field of view of the filter, each mirror reflects the image of a different star in the pattern onto a common point on a detector (18), thereby providing a detectable output intensity peak that indicates the presence of the star pattern in the field of view of the filter arrangement.

49 Claims, 6 Drawing Sheets

PATTERN RECOGNITION SYSTEM

The present invention relates to a pattern recognition system and method, and more particularly to an optical pattern recognition system and method that is particularly suitable for star pattern recognition.

Satellites and spacecraft commonly use so-called "star-tracking" systems to assist in their positioning and navigation. These systems use predetermined reference or guide star field patterns to allow the satellite or space craft to determine its position and orientation. In such a system, images of the surrounding star field are collected and compared with one or more reference star patterns to allow the position and attitude of the satellite or spacecraft to be determined.

Such star pattern recognition is typically carried out electronically in a computer. The imaged star field is compared to stored reference star patterns using iterative pattern identification algorithms. However, due to the iterative nature of the process, these methods are computationally intensive and so require relatively large processing times. Furthermore, the computational requirement increases rapidly with the number of stars in the reference star pattern to be matched. Thus, although high levels of accuracy and resolution can be achieved with a sufficiently high level of processing power and complexity in the hardware and software systems used, as such higher processing power is typically not always available onboard a spacecraft or satellite due to the power, space, weight, etc., restrictions that inevitably exist, the accuracy and processing speed available in practice with such electronic star pattern recognition systems is restricted. Furthermore, electronic systems tend to be relatively fragile, and so pattern recognition systems that rely on electronic processing can be more susceptible to failure in the relatively extreme conditions encountered in space.

It is also known to carry out pattern recognition optically, and optical pattern recognition systems can avoid some of the problems of electronic pattern recognition systems discussed above, such as the need for extensive computer processing of data.

In an optical pattern recognition system, the input scene to be analysed is Fourier transformed from an imaged input plane onto a so-called "matched" filter arrangement, which filter arrangement records the conjugate Fourier spectrum of the pattern to be recognised (and so is representative of the pattern to be recognised). The output of the filter arrangement is then detected optically using e.g. a charge coupled device (CCD) camera. The filter arrangement is such that a bright spot (light intensity peak) can be imaged onto the detector when part of the input scene matches the scene the filter is set-up to recognise. The presence or otherwise of the bright spot gives an indication of the correlation (match) between the input scene and the image the filter is set to recognise.

In practice so-called 4-f coherent correlators are used for optical pattern recognition systems. In such arrangements, incoherent illumination from an input scene to be analysed is imaged to a device such as a spatial light modulator (SLM) to form an intermediate image of the original scene to be analysed in the form of a temporary recording of an image of the original input scene. This intermediate image is then illuminated with illumination from a coherent source (such as a laser). The intermediate image of the input scene (SLM) produces a corresponding modulation of the coherent wavefront with which it is being illuminated.

The coherent light wavefront (now modulated with the input scene) then passes through a Fourier transforming element (lens) that transforms the imaged input scene into its spatial frequencies onto the optical filter arrangement. The optical output of the filter arrangement is focussed by a second Fourier transforming element (lens) onto the detector. As discussed above, a correlation (light intensity) peak is detected when (part of) the image of the input scene "matches" the predetermined image which the filter is intended to recognise.

In effect, in such a system the filter arrangement is set up such that its impulse response matches the component of the input signal it would receive when the image it is intended to recognise is part of the input image. The field distribution incident on the filter arrangement is the Fourier transform of the input signal and the field distribution transmitted by the filter contains a plane wave that can be brought to a bright focus by a Fourier transforming element when a match exists.

One drawback with such a coherent correlator arrangement is that the correlator needs coherent input illumination. As the input scene will normally be illuminated incoherently, it is therefore necessary to somehow provide from that scene coherent input illumination for the correlator. As described above, this is typically done by forming an intermediate image (typically an (up-dateable) recording) of the original input scene which can then be illuminated using a coherent light source such as a laser so as to provide the required coherent input illumination for the correlator. The intermediate image for illumination by the laser may be formed e.g. by recording the original input scene on photographic film or by recreating it using a spatial light modulator (SLM) such as a Liquid Crystal Light Valve (LCLV).

It is also known to carry out incoherent optical correlation in which the incoherent original input image is passed directly to a correlator without conversion to a coherent image. However, incoherent correlators have worse signal to noise ratios than coherent correlators and so are less sensitive and less able to reliably distinguish objects from a background than coherent correlators.

According to a first aspect of the present invention, there is provided a method of recognising a pattern of stars, comprising:
  inputting light from a star field to an optical filter arrangement, the filter-arrangement being arranged to provide an identifiable optical output in response to an input comprising light from a predetermined star pattern to be recognised; and
  detecting the output of the filter arrangement.

From a second aspect, the present invention provides a system for recognising a pattern of stars, the system comprising:
  an optical filter arrangement which is arranged to provide an identifiable optical output in response to input light from a predetermined star pattern intended to be recognised; and
  a detector for detecting the output of the filter arrangement;
  the system being arrangable such that light from a star field can be input to the filter arrangement.

The star pattern recognition system of the present invention uses an optical filtering arrangement to recognise particular star patterns in a distant star field. Star pattern recognition is therefore carried out optically, and so the present invention can avoid, for example, the need for extensive computer processing of data for pattern recognition.

However, in the present invention, in contrast to conventional optical correlation systems, the light emanating from the distant star field is used as the input to the optical filter arrangement. In other words, the available original starlight is used directly by the system to determine whether a predetermined star pattern is present in the starfield (i.e. the light which is incident upon the filter arrangement originates from the stars themselves). The present invention does not therefore involve the formation of an intermediate image of the distant star field, (e.g. on an SLM) which is then illuminated by a laser to provide a source of coherent illumination for the pattern recognition filter arrangement. The present invention therefore avoids the need to generate some form of intermediate image of the distant star field (e.g. on an SLM), and the need to provide a laser to then illuminate such an intermediate image.

The Applicants have recognised that in practice the stars in a distant star field effectively comprise a set of isolated point sources against a dark background, and that that means that optical identification of a star pattern in the star field can be carried out to a sufficiently high level of accuracy using the available light from the star field directly. The Applicants have found that even with the star light directly incident on the filter arrangement, a sufficiently distinguishable output can be obtained in response to illumination from a predetermined star pattern to allow that star pattern to be recognised.

The present invention thus provides a method and system in which star pattern recognition is carried out optically, but without the need to form an intermediate image of the starfield which has to be illuminated by a coherent light source to provide an input on which the system may operate. The present invention therefore provides a relatively fast, accurate, robust, lightweight, compact star pattern recognition system which may operate at a relatively low level of power consumption, as compared to existing star tracking systems (whether electronic or optical).

The optical filter arrangement that is used to recognise a particular star pattern can be any suitable such arrangement that can give an indication of whether there is a match between the distant star field and the predetermined star pattern that the filter is intended to recognise. In particular, it should give an identifiable output that can be detected by the detector when illumination from a distant star field which matches the predetermined pattern that the filter is intended to recognise appropriately illuminates the filter arrangement.

The output of the filter arrangement could be and preferably is such that when it is appropriately focussed onto the detector, a light intensity peak is formed on the detector when a star pattern match exists, as in existing optical correlation arrangements. The presence of the light intensity peak would thus indicate a suitable pattern match (i.e. pattern recognition). A lower intensity peak may be output when there is no match, or there could be no light output at all.

Generally speaking the filter arrangement can be any suitable such arrangement. It is effectively in the frequency plane of the distant star pattern and should effectively act as a phase modulator in the frequency plane (i.e. provide an output which is phase modulated with respect to the input light, such that the phase of the individual frequency terms is manipulated by the filter). Thus, for example, appropriate phase filtering optical filters known for use in existing optical correlators, such as a holographic element, can be used for the filter arrangement.

As discussed above, each star in the star field may be treated as a point source of light, and, furthermore, the Applicants have recognised that at the relatively great distances involved, the light originating from the stars will approximate to plane waves across the field of view of the filter arrangement. The Applicants have further recognised that by redirecting these plane waves in an appropriate manner, it is possible to provide multiple mutually displaced overlapping images of the star field that can be brought to a common focus, such that by, for example, arranging the overlapping images such that different stars in each of the images of the star field formed overlap (coincide) at the same point on the detector when the correct star field is incident on the filter arrangement, then a light intensity peak will be detected by the detector when a match exists. (It will be appreciated that as the images can be brought to a common focus, they may be moved relative to one another in the plane of the common focus so that different parts of the images overlap.)

Thus, in a particularly preferred embodiment, the filter arrangement is arranged to form a plurality of images of the star field lying within its field of view that can be brought to a common focus at the detector. The arrangement should further be such that different parts of each respective image can be arranged to overlap (coincide) at the common focus at the detector.

In this arrangement, the different images of the starfield formed by the filter arrangement are preferably arranged such that when a pattern in the input starfield matches the predetermined pattern to be recognised by the filter arrangement, parts of each of the respective images of the starfield corresponding to images of different stars in the star pattern to be recognised will overlap (coincide) at a common point on the detector to provide an output peak of higher intensity (which can be detected to indicate a pattern match).

On the other hand, if no pattern in the input distant star field matches the pattern the filter is set up to recognise, the respective images of the starfield formed by the filter arrangement will not be aligned correctly for images of component stars of the input starfield to overlap exactly at a common point on the detector. In this case there should be no (or a smaller) light intensity peak at the detector.

In this arrangement, each image of the starfield formed by the filter arrangement can effectively be used to redirect the image of one particular star in the star pattern to be recognised appropriately onto the detector. Thus the filter arrangement should produce at least as many differently oriented (star pattern) images as there are stars in the pattern to be recognised. It should be noted in this regard that while the filter arrangement itself may be more complex the greater the number of stars in the pattern to be recognised, in use the recognition process is effectively independent of the number of stars in the pattern to be recognised. Thus the present embodiment can be used to recognise patterns containing many stars (for example up to 100, although 16 has been found to be a suitable number) and hence be correspondingly more accurate without performance degradation, or increasing the processing time, as compared to, for example, electronic pattern recognition systems.

It will be appreciated that when a pattern is recognised in this arrangement, the intensity of the output peak obtained will depend upon the number of stars whose images are combined at the common point on the detector. The measured intensity of an output peak obtained at the detector may thus be used to assess whether the star pattern has been correctly "matched". In its simplest case, the detector could simply assess whether a peak above a given threshold is obtained. In a more sophisticated arrangement, the output peak detected could be compared to an expected peak intensity value (based e.g. on the known intensities of the stars whose images will overlap when the pattern is matched) to see if a match has been obtained. This can enhance the chances of successful pattern identification without a large increase in the complexity of the system.

It is believed that the above optical pattern recognition arrangement is advantageous in its own right, and not just in the star pattern recognition context. Thus, according to a third aspect of the present invention, there is provided an optical pattern recognition system, comprising an optical filter arrangement that will provide an identifiable optical output when an input scene containing a predetermined pattern that the filter arrangement is set up to recognise is input appropriately to the filter arrangement, the filter arrangement being such that it can produce a plurality of images of the input scene that can be brought to a common focus at a detector; and a detector for detecting the output of the filter arrangement.

According to a fourth aspect of the present invention, there is provided an optical pattern recognition method, comprising inputting a scene to be analysed to an optical filter arrangement that will provide an identifiable optical output when an input scene containing a predetermined pattern that the filter arrangement is set up to recognise is input appropriately onto the filter arrangement, the filter arrangement being such that it can produce a plurality of images of the input scene that can be brought to a common focus at a detector;

focussing the images produced by the filter arrangement onto a detector; and detecting the output of the filter arrangement with the detector.

In these aspects of the invention, since the filter arrangement should, as discussed above, be in a frequency plane, rather than an image plane, it may be necessary depending on the nature of the illumination from the scene to be analysed, to image the scene to be analysed to an image plane (e.g. to an input aperture, e.g. using a lens), and then optically Fourier transform (preferably achromatically) the light distribution onto the filter arrangement to provide the appropriate input illumination for the filter arrangement. This could be done, for example, by using an imaging lens to form an image (e.g. at an input aperture) of the scene to be analysed, which image is then Fourier transformed to the filter plane. Such imaging of the scene to be analysed may in particular be necessary where, for example, the input scene to be analysed is not in the far field (unlike a distant starfield which is in the far field).

As discussed above, in these aspects and embodiments of the present invention the multiple images formed by the filter arrangement will normally be displaced relative to one another, such that different parts of each respective image will or can be arranged to overlap (coincide) at the common focus at the detector. Thus preferably the filter arrangement produces a plurality of mutually displaced images of the input scene.

The filter arrangement could produce the multiple images by transmission or reflection. In a particularly preferred embodiment the multiple images are produced by appropriate reflection of the input scene. Thus preferably the filter arrangement comprises a plurality of reflective surfaces, each arranged to provide one appropriate image of the star field. The reflective surfaces should each be oriented and tilted appropriately relative to each other. They can be provided by mirror elements or a holographic element arranged to reflect light. Particularly where they comprise mirrors, the reflective surfaces are preferably arranged in an array, and are preferably tiltable relative to each other. In such an arrangement each reflective surface is preferably independently tiltable about two axes of rotation.

In such an arrangement each reflective surface (e.g. mirror) will reflect an image of the input star field. By tilting the reflective surfaces relative to one another, different parts of each reflected image can be arranged to overlap when the reflected images are combined at the detector. Each reflective surface can thus be arranged to reflect one particular star from the star pattern to be recognised onto a common point on the detector when the correct input starfield is in the field of view of the system. In other words, although each reflective surface will reflect the whole star pattern in the field of view of the system, by differentially aligning each individual reflective surface, a different individual star from the pattern will be imaged onto a common point on the detector by each reflective surface when the correct input star field is in the field of view of the system.

As discussed above, the number of reflective surfaces should match or exceed the number of stars in the pattern to be matched. Thus, for example, there may be up to 100 reflective surfaces, although 16 has been found to be a suitable number.

A transmission filter arrangement for providing the multiple (overlapping) images would operate in a corresponding manner, and could use, for example, a transmission volume phase hologram for the filter arrangement.

The optical filter arrangement may be arranged to be rotationally invariant, i.e. such that it will provide an identifiable output, e.g. light intensity peak, in response to light input from a predetermined star pattern to be recognised regardless of the in-plane (i.e. about the optical axis of the filter arrangement) rotational orientation of the filter arrangement relative to the distant star field being assessed. This can be achieved with, for example, a holographic filter element by recording the element with an appropriate pattern of concentric circles each arranged a distance away from the common centre of the circles corresponding to the relevant star's distance from a central point of the star pattern to be recognised. An output peak will be obtained when the spacing of the circles from their common centre matches the spacing of a group of stars from a given centre point.

However, in a particularly preferred embodiment, the filter arrangement only gives the identifiable output "recognising" the star pattern in the input distant starfield when the star field is correctly rotationally oriented with respect to the filter about the optical axis of the filter arrangement. It can be important for satellites and spacecraft to know their rotational orientation and so having a filter arrangement that is rotationally sensitive allows this to be determined.

A rotationally sensitive filter arrangement could, e.g., comprise an array of relatively tilted mirrors or other reflective surfaces of the type discussed above. In such an arrangement, rotation of the filter array relative to the distant star field will give rise to a corresponding rotation in the star field images reflected by the filter. The parts of the reflected images which overlap at the detector will therefore differ, depending on the rotational orientation of the filter to the distant star field and so only when the correct rotational orientation is achieved will the images of the appropriate stars in the star field overlap at the detector.

Where the filter arrangement is rotationally sensitive, it is preferably arranged to be rotatable relative to the distant star field so that the star field can be tested at different rotational orientations. In this way the filter can be rotated until an identifiable output is obtained, thereby indicating the correct rotational orientation relative to the predetermined star pattern in the input star field. In a particularly preferred such arrangement, the optical axis of the optical filter arrangement is arranged to coincide with a rotational axis of the spacecraft or satellite in which it is mounted, and preferably with the major rotational axis of the spacecraft or satellite in which it is mounted. In this way the filter can be fixed to rotate as the e.g. satellite rotates about its major axis, without the need for a power supply.

The output of the filter arrangement could simply be used as an indication of the presence or otherwise of the star pattern to be recognised in the field of view of the pattern recognition system. However, in a particularly preferred embodiment, the arrangement is such that the output can also be used to give an indication of the angle at which the optical axis of the filter arrangement is pointing. This can be important particularly in the satellite and spacecraft context, as it is often desirable to know the pointing angle of a spacecraft or satellite.

Preferably the arrangement is such that if the optical axis is pointing straight at the star pattern to be recognised then the filter output peak is in one position on the detector (e.g. at its centre), but the output peak is moved relative to that "on-axis" position if the optical axis is pointing away from the star pattern (but the star pattern is still within the field of view of the system). In this way, the position of the output "recognition" peak on the detector can give an indication of the pointing direction of the optical axis of the pattern recognition system relative to the position of the star pattern being recognised.

The above discussed reflective surface array filter arrangement can operate in this manner, since tilting that filter arrangement relative to the input starfield will result in a uniform translation of the position of each of the images formed, such that any parts of the images which previously overlapped will still do so, but at a different common point on the detector. The position of the output peak corresponding to the common overlap point will simply be translated across the output focal plane at the detector. The magnitude of this shift of the output peak may be used to determine the pointing angle of the spacecraft or satellite on which the system is mounted.

In a particularly preferred arrangement of this embodiment, the filter arrangement is arranged with its optical axis parallel to the major rotational axis of the satellite or spacecraft and is arranged to rotate freely about the major axis of the spacecraft or satellite, such that the filter arrangement will then rotate at the same rate, but in the opposite direction, to the rotation of the spacecraft or satellite. This will then provide continual observation of the pointing angle of the spacecraft or satellite without requiring a power supply.

In a particularly preferred embodiment, the optical filter arrangement can be used to recognise a plurality of different predetermined star patterns, i.e. is or can be arranged to provide an identifiable output in response to input light from a plurality of predetermined star patterns.

In one such arrangement a single filter construction could, for example, be set to recognise a plurality of different star patterns. For example, the filter could be arranged to recognise different star patterns depending upon the angle at which the input light is incident upon the filter or the part of the filter upon which it is incident. In such an arrangement, the input light would then be directed so as to be incident on different parts of the filter and/or to be incident upon the filter at different angles, depending upon which star pattern it is desired to recognise. This type of arrangement is particularly suitable where a holographic filter element is used, as a plurality of different star patterns to be recognised may be recorded in the volume of the hologram, e.g. at different angular or spatial locations.

Additionally or alternatively, the filter arrangement may be able to recognise only one star pattern at any one time, but can be adjusted in use to recognise different star patterns. For example, where the filter arrangement comprises an array of reflective (mirror) surfaces, those surfaces could be movable relative to each other in use so that the array can be changed to recognise different star patterns. Preferably the filter arrangement is programmable in use to detect different star patterns. In such an arrangement, a plurality of sets of relative positions for each reflective surface corresponding to each of the star patterns to be recognised could be stored and then used as desired. Thus preferably, where the filter arrangement comprises a mirror-array, the array is preferably programmable such that the individual mirrors can be adjusted to adopt different relative positions in use. With a programmable filter arrangement, many star patterns could be recognised by a single system and that could allow full 4n steradian coverage by the system, thereby facilitating more autonomous operation.

The optical output from the filter arrangement should be brought appropriately to the detector, e.g. focussed by a Fourier transforming element (to transform the filter's output from a frequency plane distribution into an image plane distribution) onto the detector for detection. This could be done using, for example, a separate focussing (and Fourier transforming) element, such as a lens or mirror, provided after the filter. However, in a particularly preferred embodiment the filter arrangement itself focuses, etc., its output onto the detector as this reduces the number of components in the system. For example, if the filter is a holographic element, the element may be recorded with a converging reference wave so that the filter will act to focus the output light. Where the filter comprises a plurality of reflective (e.g. mirror) surfaces, the same effect may be achieved by using focussing, such as parabolic or spherical, shapes for the reflective surfaces.

The optical system is preferably achromatic, so that plural (and preferably all) frequencies in the multispectral star light can be brought to a common focus at the detector. This helps to maximise the available star light used at the detector for the pattern recognition. Thus the filter arrangement is preferably achromatic, as are any lenses, etc. used. With regard to the filter arrangement, a mirror array arrangement is achromatic by its very nature. In the case of a holographic filter element, the holographic element can, e.g., be recorded with a gradient in the spatial periods (spacing) of its (reflecting or transmitting) Bragg planes through its depth (i.e. be "chirped"), to allow it to reflect (or transmit) multiple wavelengths.

It is also preferred that, where necessary, the system is adapted to compensate for any dispersion (e.g. chromatic dispersion) that may take place in the system. Such compensation can be carried out in any suitable manner known in the art.

It will be appreciated from the above that the use of a mirror array as an optical filter arrangement in a pattern recognition system is particularly advantageous, since, for example, mirrors are achromatic, and a mirror array can readily be used as a programmable filter arrangement. Thus, according to a fifth aspect of the present invention, there is provided an optical pattern recognition system, comprising an optical filter arrangement comprising a plurality of mirrors that have or can be arranged to have different orientations with respect to one another for producing a plurality of images of the input scene that can be brought to a common focus at a detector; and a detector for detecting the output of the filter arrangement.

According to a sixth aspect of the present invention, there is provided an optical pattern recognition method, comprising inputting a scene to be analysed onto an optical filter arrangement comprising a plurality of mirrors having different orientations with respect to one another; and focussing the images produced by the mirrors onto a detector.

It is also believed that using a "chirped" holographic filter element is new and advantageous in its own right (since it is again, e.g. more achromatic). Thus, according to a seventh aspect of the present invention, there is provided an optical pattern recognition system, comprising: an optical filter arrangement comprising a holographic element having a plurality of similarly orientated Bragg planes arranged through its depth, the Bragg planes further having a gradient in their relative spacing through the depth of the holographic element; and a detector for detecting the output of the filter arrangement.

According to an eighth aspect of the present invention, there is provided an optical pattern recognition method, comprising: inputting a scene to be analyzed to a optical filter arrangement comprising a holographic element having a plurality of similarly orientated Bragg planes arranged through its depth, the Bragg planes further having a gradient in their relative spacing 5 through the depth of the holographic element; and focussing the image produced by the holographic element onto a detector.

In these aspects of the invention, the holographic element preferably comprises plural sets of series of similarly orientated Bragg planes, with each set of Bragg planes having, or capable of being arranged to have, a different orientation with respect to other sets of Bragg planes, for producing, as discussed above, a plurality of images of the input scene that can be brought to a common focus at the detector.

As has already been discussed above, in the above fifth to eighth aspects of the invention, it may again be necessary to appropriately image and Fourier transform the scene to be analysed to provide an appropriate input to the (frequency plane) filter arrangement, for example, where the scene to be analysed is not in the far field.

It will be appreciated that in these aspects and embodiments of the present invention, the multiple images formed by the filter arrangement will normally be displaced with respect to one another, such that different parts of each respective image will or can be arranged to overlap (coincide) at the detector. Thus the images produced by the filter arrangement are preferably mutually displaced with respect to each other.

The detector used in any of the aspects and embodiments of the present invention may be selected as appropriate depending upon the nature of the response to be identified. For example the detector may be a camera or charge-coupled device (CCD). The detector may detect only visible light or only radiation not lying in the visible part of the electromagnetic spectrum, or both visible light and other electromagnetic radiation. It should be noted in particular that the present invention extends to the case in which the star light detected for the pattern recognition is not or may not be visible. The range from visible light to microwave radiation frequencies has been found to be particularly suitable for the present invention.

As discussed above, the detector can preferably assess the intensity of any detected light intensity peak. It can more preferably determine whether a peak is above a particular, preferably predetermined, threshold, so as to, for example, facilitate more reliable identification of a true correlation peak. It can also preferably determine whether the peak is within a particular, preferably predetermined, margin of a given intensity value.

If desired, more than one detector for the output of the filter arrangement may be provided. For example, the output from the filter arrangement may be provided to a plurality of detectors which are, e.g., provided for different purposes, such as to provide progressively more accurate identification of the star pattern. In such an arrangement, preferably two detectors are used. For example, a first detector with a relatively large field of view may be used to provide a relatively coarse estimate of the pointing angle of a satellite, with a second detector with a narrower field of view then being used to provide finer determination.

It would also be possible to use two (or more) filter arrangements (and corresponding detector(s)) if desired. For example, a rotationally invariant filter could be used for coarse identification with a rotationally sensitive filter then used to determine rotational orientation.

Steps may be taken to reduce unwanted noise and/or stray light interference in the light incident upon the detector. For example, an aperture may be arranged in front of the detector.

Further, e.g. electronic, processing of the detected response may also be carried out, for example to reduce background noise, or to enhance the correlation peak obtained.

The system of the present invention preferably further includes an aperture arranged in front of the optical filter arrangement to restrict the field of view of the system. This can help to, for example, reduce stray light interference at the filter. It can also help to ensure that the light incident on the filter is in the form of plane waves (as a restricted aperture can ensure that the wavefronts are planar at least over the area of the aperture). A suitable aperture size has been found to be around 10 cm diameter. A suitable field of view for the system has been found to be up to 5° or 6°. (This should be contrasted with conventional systems which typically can only have a 1° field of view).

Other optical components, such as a lens to focus the star light onto the filtering arrangement can be placed in front of the optical filter arrangement if desired. However, unlike in conventional optical correlators, it is not necessary in the system of the present invention to provide a component, such as a Fourier transforming element (e.g. lens), to transform the light to be input to the filter arrangement. This is because the input star light will already be achromatically Fourier transformed (i.e. transformed into spatial frequency components) by free space propagation of the light fields as a result of the astronomical distances over which it travels to reach the pattern recognition system. The filter arrangement is therefore effectively in the frequency plane of the distant starfield.

Although the present invention has been described with particular reference to star pattern recognition systems, as will be appreciated by those skilled in the art, it is also applicable to pattern recognition in other contexts, particularly where the pattern to be recognised consists of relatively isolated point-like sources in a relatively uncluttered, uniform background (i.e. is like a star pattern).

For example, it could be used to identify planetary arrangements in a similar fashion to a star pattern. In this case, although the planets may be more extended than stellar point sources, the consequence would simply be that any correlation peak would be less precise and there may be greater probability of erroneous image overlaps giving rise to secondary peaks. This could reduce the accuracy of the system but would not prevent it from working. It would also be possible to perform computational operations such as sub-pixel interpolation techniques to try to enhance the accuracy if broader correlation peaks are being obtained if desired. This problem would be exacerbated, the larger the individual image sources to be recognised become.

The invention could also be used, for example, in spacecraft docking applications where a target in the form of a number of point sources against a uniform background could be arranged on the docking target and then tracked using a pattern recognition system in accordance with the present invention. In this case, as the two craft approach, some refocussing of the system may be necessary as the distance to the target pattern reduces to ensure appropriate imaging of the target (i.e. the output of the filter) onto the detector array when the target is within the field of view of the system. The amount of de-focus could also be used to determine distance, and the rate of de-focus could be used to determine rate of approach. As the size of the target would also change as the craft approach, a scale-invariant system, or some form of scale compensation or adjustment may also be necessary.

Thus, according to a ninth aspect of the present invention, there is provided an optical pattern recognition method, comprising:

inputting light from a scene to be analysed to an optical filter arrangement, the filter arrangement being arranged to provide an identifiable optical output in response to an input comprising light from a predetermined pattern to be recognised; and detecting the output of the filter arrangement.

From a tenth aspect, the present invention provides an optical pattern recognition system, the system comprising:

an optical filter arrangement which is arranged to provide an identifiable optical output in response to input light from a predetermined pattern intended to be recognised; and a detector for detecting the output of the filter arrangement;

the system being arranged such that light from a scene to be analysed can be input to the filter arrangement.

These aspects of the present invention can include any or all of the above preferred features of the present invention.

A number of preferred embodiments of the present invention will now be described, by way of example only, and with reference to the accompanying drawings, in which:

FIG. 1 shows a first embodiment of a pattern recognition system for star tracking in accordance with the present invention.

Figure 1:
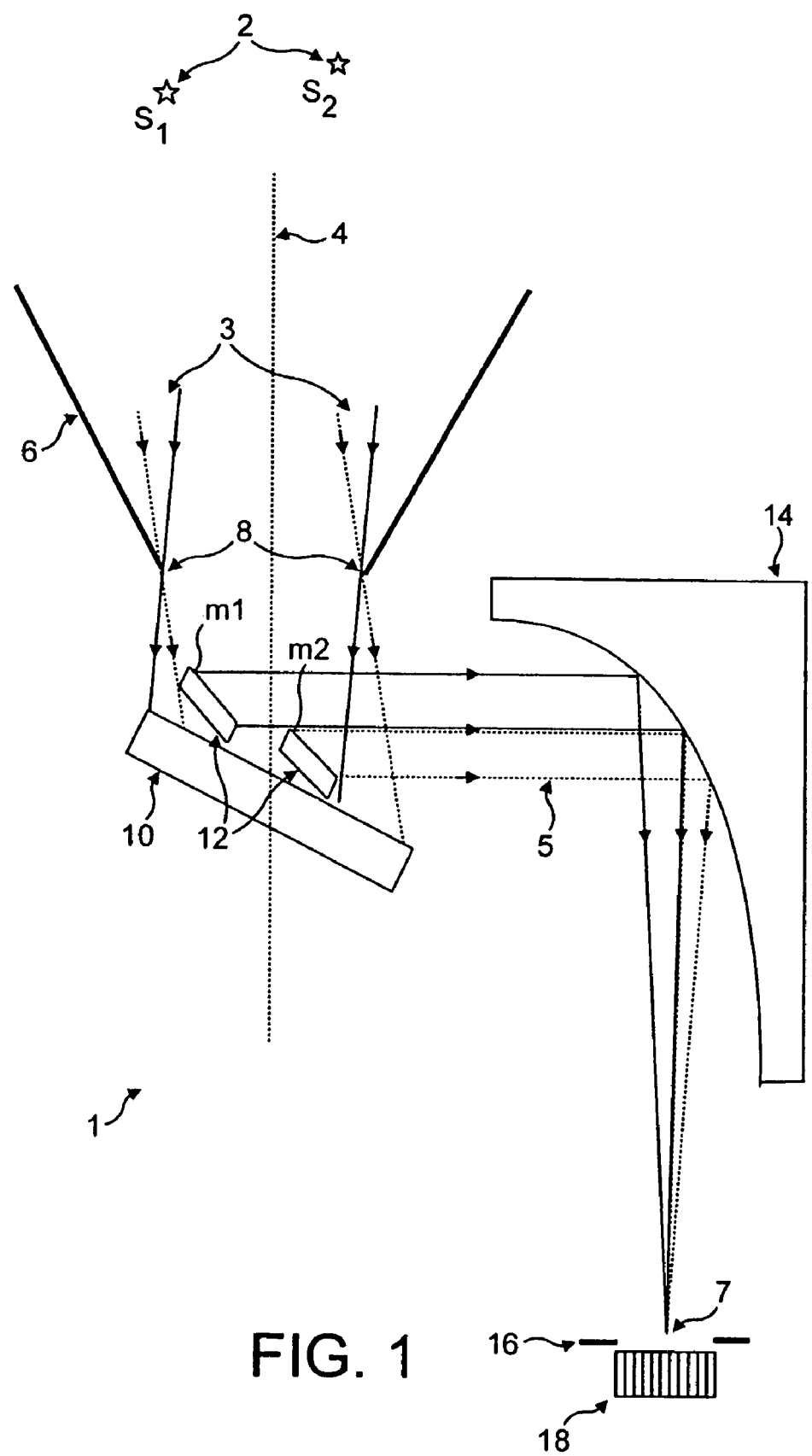
FIG. 1 is a schematic diagram of a star pattern recognition system according to a first embodiment of the present invention.

The system 1 includes an optical filter arrangement 10 having an optical axis 4, which axis is arranged to coincide with the major axis of rotation of the satellite on which the pattern recognition system is mounted. The filter arrangement 10 consists of an array 12 of two mirrors M1, M2, each of which is independently tiltable about two axes of rotation.

The system further includes an aperture 6 arranged in front of the filter arrangement 10 to restrict the field of view 8 of the filter arrangement. A parabolic mirror 14 (which acts as an achromatic Fourier transforming element to allow the beams reflected by the mirror array to come to a common focus) is located at a distance equal to its focal length beyond the filter arrangement 10. The mirror 14 focuses light output from the filter arrangement 10 to a common focus 7 at which a detector 18 in the form of a CCD camera is located. An aperture 16 is arranged in front of the detector 18 to restrict the field of light incident upon the detector 18. The detector 18 detects the output (correlation) signal from the filter arrangement 10.

In use of this star pattern recognition system, light 3 from a distant star field 2 will enter the system 1 through the aperture 6 and be incident upon the mirror array 12 of the filter arrangement 10. The light 5 output from the filter arrangement 10 is then incident on the parabolic mirror 14 which acts to redirect and focus it onto the detector 18.

Each mirror, M1, M2, of the mirror array 12, reflects an image of the distant star field and those images are brought to a common overlapping focus at the detector 18 by the parabolic mirror 14. The mirrors M1, M2 are tilted relative to each other so that the images they produce are displaced relative to each other at the detector 18 (i.e. such that they do not overlap exactly, but rather different parts of the two images overlap and are coincident on the detector 18). This feature is used as discussed above to recognise a given star pattern by arranging the mirrors M1, M2 such that they reflect different stars in the star pattern to be recognised to the same point on the detector 18 when the correct pattern is in the filter arrangement's field of view, thereby providing an intensity peak at the detector 18 when the pattern is recognised.

The case where the star pattern recognition system 1 of FIG. 1 is arranged to recognise a predetermined pattern in the input star field 2 consisting of two stars S1 and S2 will now be considered by way of example. The mirrors M1 and M2 of the mirror array 12 each reflect an image of the whole of the starfield 2 lying within the field of view 8 of the filter arrangement 10.

Mirror M1 is arranged such that the whole of the Fourier plane of the starfield which it reflects will be redirected onto the detector 18 and furthermore, such that the part of that image containing star S1 will be located at a given point on the detector 18 when the correctly oriented star pattern is in the field of view of the system. Mirror M2 is correspondingly aligned such that it will reflect the part of its reflected image of the whole star field containing star S2 onto the same point on the detector 18 when the correctly oriented star pattern is in its field of view. The two parts of the reflected images of the whole starfield produced by mirrors M1 and M2 containing stars S1 and S2 will thus coincide and overlap at the common point on the detector when the correct star pattern is in the system's field of view, giving rise to an output intensity peak at the detector 18 which can be detected.

Figure 6:
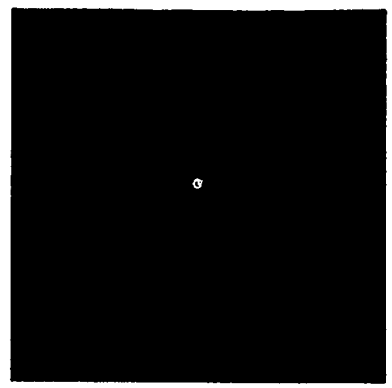
FIGS. 6, 7, and 8 show exemplary detected filter arrangement outputs when using a pattern recognition system in accordance with preferred embodiments of the present invention.

This is illustrated by FIG. 6 which shows an exemplary detector image with an output peak at its centre indicating pattern recognition.

The star pattern recognition system of FIG. 1 is sensitive to in-plane rotation between the filter arrangement and distant star field (i.e. relative rotation in the plane perpendicular to the optical axis 4 of the filter arrangement). This is because if the filter arrangement 10 is rotated relative to the star field 2, that will give rise to a corresponding rotation in the star field pattern far field distribution as reflected by the mirrors M1 and M2 of the array 12. However, as the images are rotated, the portions of each image which overlap at the detector 18 will no longer necessarily correspond to the positions of stars S1 and S2 and so no output peak of higher intensity will be detected at the detector 18.

Figure 7:

The effect of such in-plane rotation relative to the star field is illustrated by FIGS. 6 and 7. FIG. 6 shows the detected image for no in-plane rotation ($\theta=0°$ in-plane field rotation, where $\theta$ is the relative in-plane angle between the filter and the star pattern it is set up to recognise and can be anywhere between $+180°$ and $-180°$) and FIG. 7 shows the detected image where there is some relative in-plane rotation ($\theta=4.5°$ in-plane field rotation). As can be seen, the bright detected spot in FIG. 6 indicating pattern recognition is not present in FIG. 7, as the relevant stars in the different images produced by the mirrors M1, M2 no longer overlap.

To take account of this rotational sensitivity, the star pattern recognition system 1 is rotatable in use, so that its in-plane rotation can be changed. This could be achieved, e.g., by mounting it on an appropriately driven stage or platform. In one preferred arrangement, the system 1 is arranged such that its optical axis 4 coincides with the major axis of rotation of the satellite on which it is mounted. It could then be fixed so that as the satellite rotates, the filter arrangement 10 will also rotate about its optical axis 4. A correlation peak would then be detected by the detector 18 when the mirror array 12 of the filter 10 faces the star field 2 at the correct in-plane angle. This arrangement would allow the pattern recognition system to rotate in use without the need for additional power to drive its rotation. Rotation of the system about the major axis of the satellite may also allow information regarding the spin rate, precession angle and precession rate of the satellite to be obtained.

As well as being rotationally sensitive, in the FIG. 1 arrangement if the pointing direction of the optical axis 4 of the filter arrangement changes (because, e.g., the pointing direction of the satellite changes), then the detected filter output will again change. This is because as the optical axis 4 tilts, so does the mirror array 12. This will cause a translation in the light output 5 from the filter arrangement 10 across the parabolic mirror 14, and hence of each of the reflected images across the output plane at the detector 18. However, the same parts of the reflected images will still overlap. Thus once a correlation peak has been obtained, a change in the pointing direction of the filter arrangement (satellite) will simply result in a translation of the light intensity peak across the plane of the detector 18. The magnitude of the translation of the peak may be measured and used to determine the change in pointing angle of the satellite.

Figure 8:
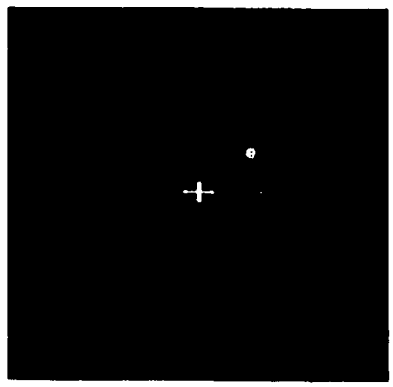

This translation of the correlation peak as a result of a change in pointing direction is illustrated by FIGS. 6 and 8. FIG. 6 shows the case where the star pattern is in the centre of the field of view of the filter arrangement 10 (i.e. the optical axis 4 is pointing directly at the star pattern being recognised) and FIG. 8 shows the case where the star pattern is "off-centre" (i.e. the optical axis is pointing away from (at an angle to) the star pattern. (In both cases there is no relative rotational misorientation (i.e. relative in-plane rotation $\theta=0°$).) It can be seen from FIG. 8 that the light intensity peak indicating pattern recognition has been translated from its central position in FIG. 6 due to azimuthal and altitude shifts caused by the pointing direction angular displacement.

This feature can be exploited to provide continuous observation of the satellite's pointing direction with minimal power consumption by aligning the optical axis 4 with the major rotational axis of the satellite but allowing the filter array to rotate freely about that axis (e.g. by placing it on a suitably mounted platform) rather than fixing it to rotate with the satellite. Conservation of angular momentum means that the filter arrangement will then rotate in the opposite direction but at the same angular frequency as the satellite.

The operation of the above star pattern recognition system can be considered as follows. Since the light from the star field reaching the filter arrangement 10 has been achromatically Fourier transformed due to the astronomical distances that separate the star field and the filter arrangement, each star effectively provides a planar wave front across the filter aperture that can be characterised with its own unique directional unit vector (perpendicular to the planar wave front) when viewed from the fixed position of the filter arrangement. The mirror array of the filter arrangement then acts as a multiplexing device that effectively transforms and redirects these unit vectors.

For example, considering a star field of three stars, S1, S2, S3, with unit vectors $K_1$, $K_2$, $K_3$ incident on a mirror array comprising three mirrors M1, M2, M3, then the resulting vectors due to the action of the mirrors will be $K_{1n}$, $K_{2j}$, $K_{3m}$, with n, j, and m able to take any value between 1 and 3. The set (n, j, m) indicates the reorientation of a certain vector due to any of the three mirrors (e.g. $K_{12}$ means reorientation of vector $K_1$ due to the action of mirror M2). Matching of a star pattern (i.e. a correlation peak at the detector) occurs when each incident vector is redirected in the same manner by a different mirror, i.e.:

$$K_{1n}=K_{2j}=K_{3m}, \quad n \neq j \neq m \qquad (1)$$

When this requirement is met, a plane wave that can be brought to a bright focus by a Fourier transforming element placed after the filter array is obtained.

If the system rotates relative to the star field, this provides a corresponding rotation of what is the far field of the star pattern at the input aperture of the system (i.e. where the mirror array is located). Although the relative in-plane rotation each star is subjected to is the same, rotation of the stellar field relative to the mirror array causes the directional unit vectors to re-direct in a non-uniform fashion and the condition above then ceases to be satisfied. The output plane at the detector is then composed of appropriate individual (non-overlapping) star images.

On the other hand, a change in pointing direction is equivalent to simple translations across the input plane of the Fourier transforming element and since these have the same value for all the star vectors, the result is simply translation of the correlation peak at the detector (which translation indicates the pointing direction).

Thus the system effectively uses the mirrors to align different stars in the images of the star field at the detector. If the system is tilted, the aligned stars remain aligned but their common position shifts on the detector. If the system is rotated about its optical axis, the stars' images no longer line up.

It can be seen that with this arrangement, a target star pattern is successfully identified when it appears with the field of view of the optical system and its in-plane orientation is matched with the latent orientation of the filter arrangement. The pointing direction of the star pattern recognition system can be determined by the lateral and longitudinal shifts of the recognition signal across the output plane at the detector. Because the system is entirely optical, it provides high speed processing and can be made compact and lightweight.

In a particularly preferred embodiment, each mirror in the array is independently adjustable in use to allow different array set-ups (and hence different star patterns to be recognised). Preferably, a programmable mirror array is used, with each mirror of the array 12 preferably being pre-programmed with a number of positions corresponding to those required to produce an appropriate image of particular stars in a number of different star patterns to be recognised. Using such a programmable array, the system could be programmed to achieve star pattern recognition for many star fields so that full 4Π steradian sky coverage could be achieved. This could allow a fully autonomous system, which is highly desirable for a star tracking arrangement.

Figure 2:
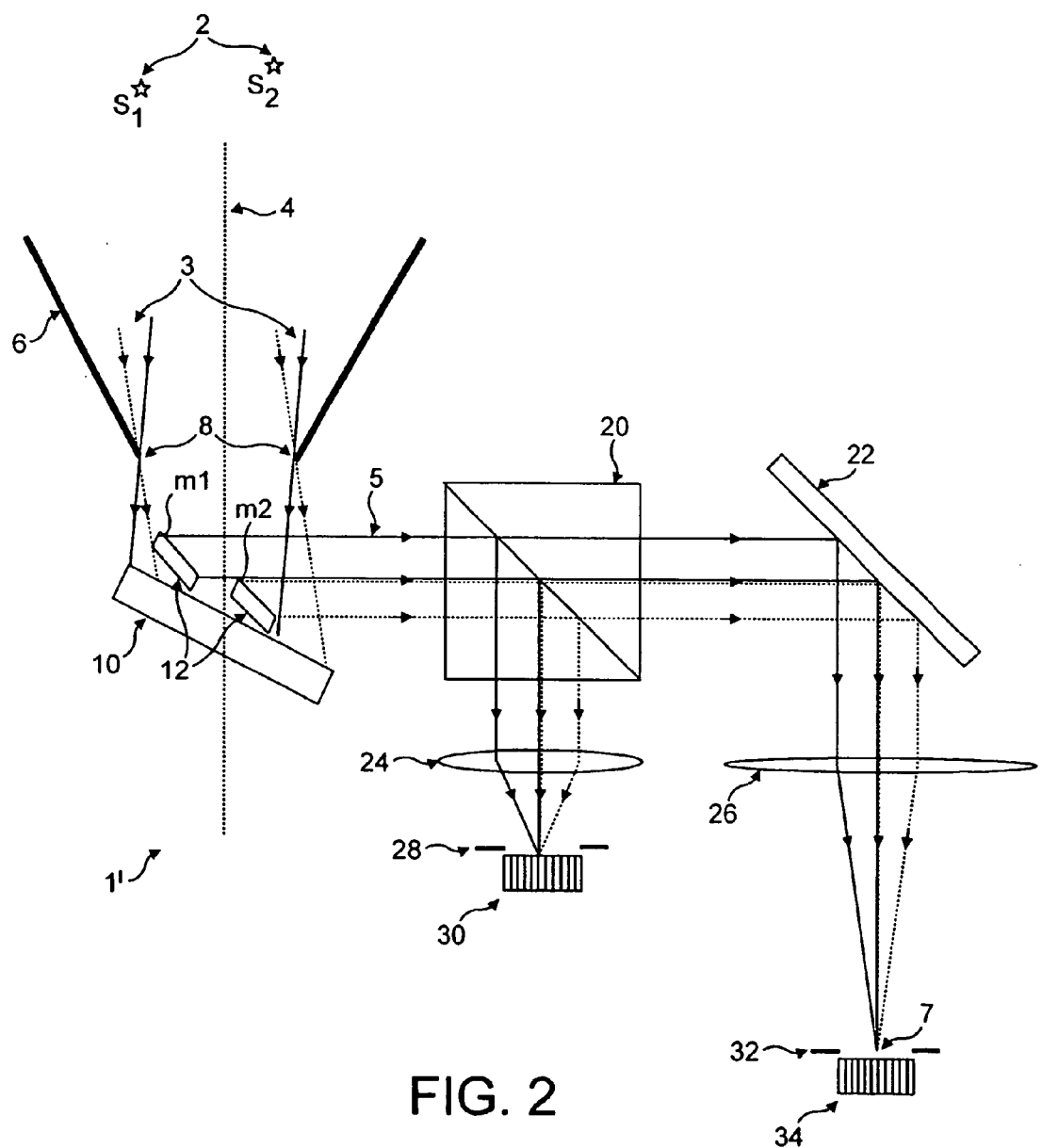
FIG. 2 is a schematic diagram of a star pattern recognition system in accordance with a second embodiment of the present invention.

FIG. 2 shows a modification of the star pattern recognition system. In this arrangement a beam splitter 20 and a mirror 22 are placed in the path of the light 5 output from the filter arrangement 10, and the parabolic mirror 14 is replaced by two Fourier transforming lenses 24 and 26. Detectors 30 and 34 with entrance apertures 28 and 32 are placed in the focal planes of the respective lenses 24 and 26.

In this embodiment of the present invention, the filter arrangement 10 acts in the same way as in the first embodiment, but its output is provided to two detectors 30 and 34 by means of the beam splitter 20 and mirror 22 arrangement. The beam splitter 20 directs part of the output light 5 from the filter arrangement 10 towards lens 24, while the second part of the output light passes through the beam splitter 20 and is incident upon mirror 22 which redirects it to lens 26.

Detector 30 has a wider field of view than detector 34. Detector 30 may therefore be used to provide a rough estimate of, for example, the general pointing direction of the satellite. Once this has been established, the second narrower field of view provided to the detector 34 may be used to give a more accurate determination of the pointing angle within the estimated range provided by the first detector 30. This arrangement, although more complex in construction, can allow faster scanning and establishment of the general pointing direction without sacrificing accuracy in use. The use of two detectors can also allow false readings caused by e.g. random radiation effects scintillating individual pixels in the detectors to be eliminated. Each detector can also provide a back-up in case of the other's failure.

Figure 3:
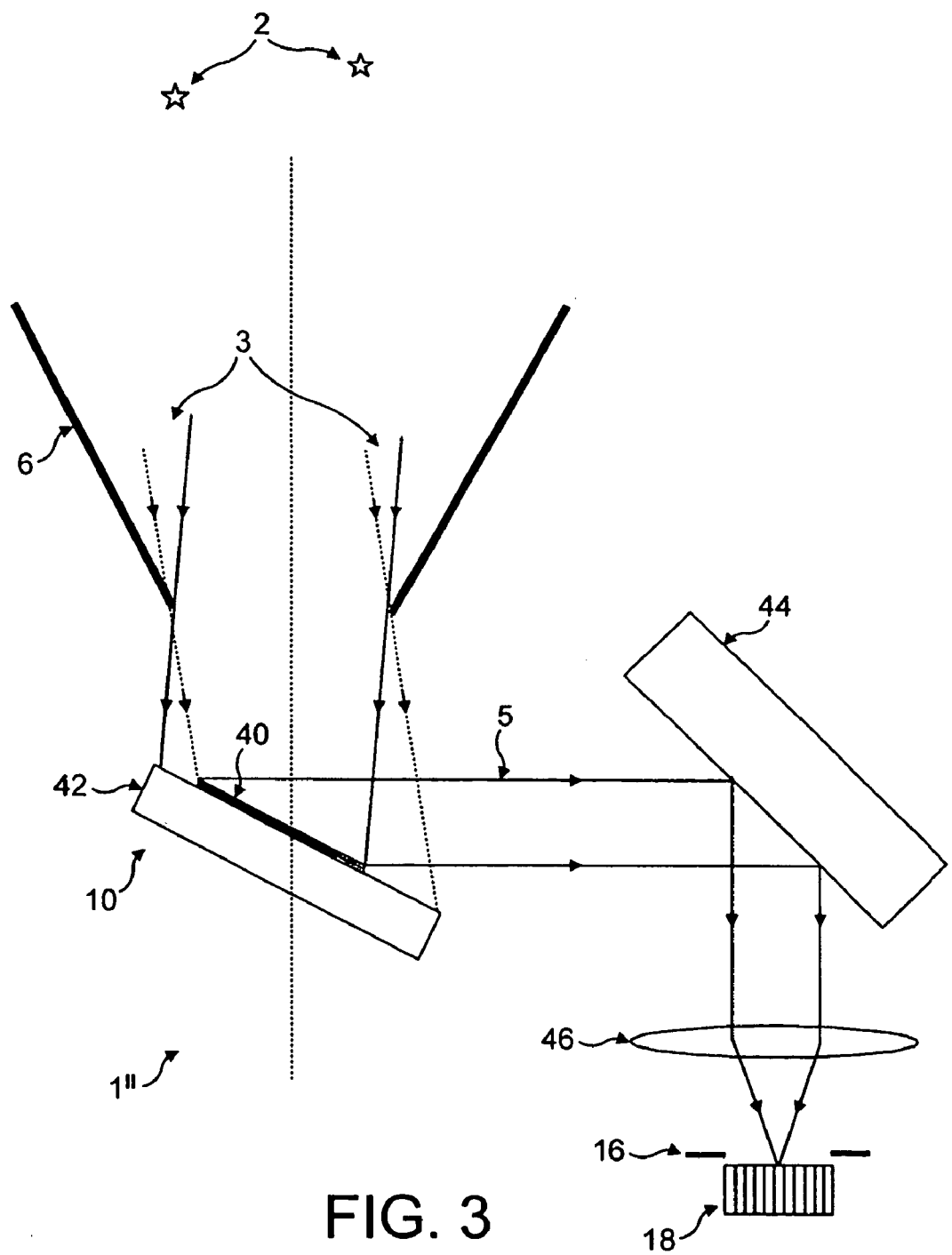
FIG. 3 is a schematic diagram of a star pattern recognition system in accordance with a third embodiment of the present invention.

FIG. 3 shows a third embodiment of the present invention which is similar to the arrangement shown in FIG. 1, except that the filter arrangement 10 comprises a reflective holographic optical element 40 supported on a substrate 42 rather than a mirror array. The parabolic mirror 14 has been replaced by a mirror 44 and a Fourier transforming focusing lens 46 which act together to bring the light 5 output from the filter arrangement 10 to a focus in the plane of the detector 18.

The holographic element 40 is a reflection volume phase holographic element and is recorded (using known holographic techniques) with a series of Bragg planes allowing it to act as a reflecting mirror-like surface for light whose wavelength matches that of the grating. One series of Bragg planes is recorded at an appropriate orientation and geometry for each star in the target star pattern.

Figure 4:
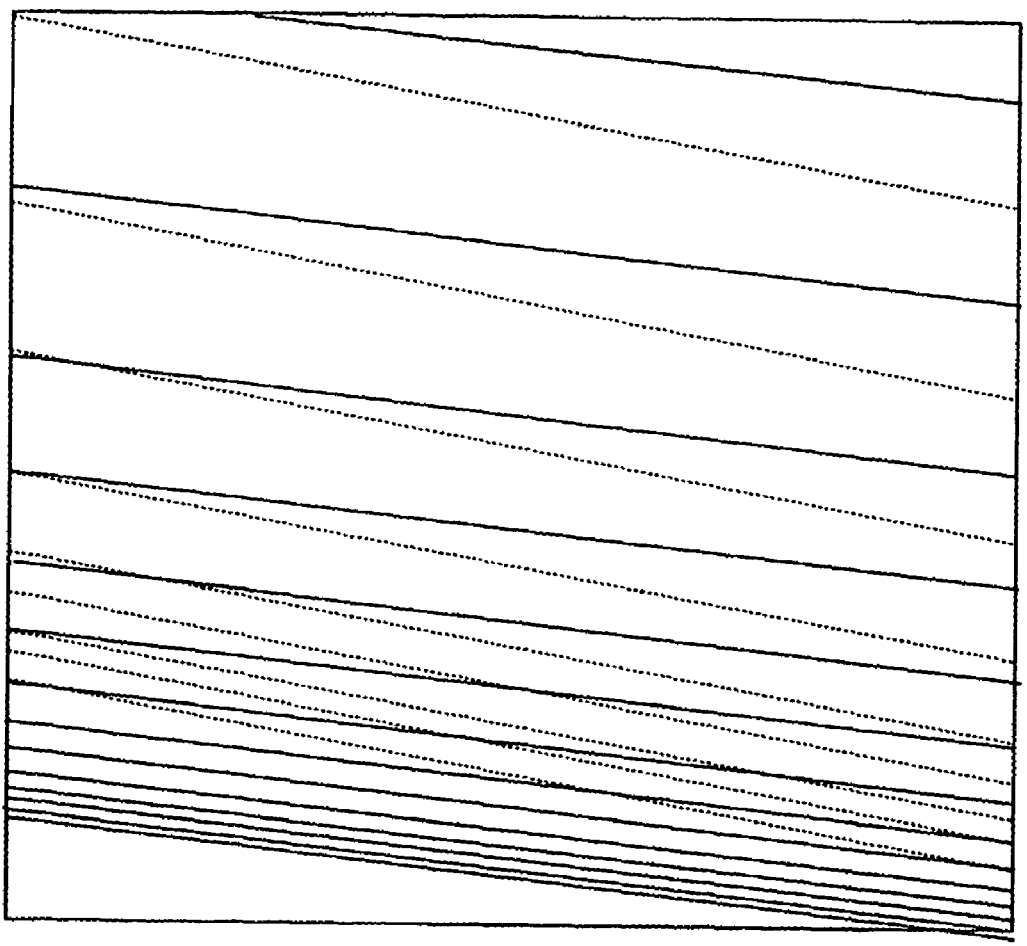
FIG. 4 is a cross-sectional view of the holographic element used for the filter arrangement used in the embodiment of FIG. 3.

FIG. 4 shows a cross-section of the holographic element 40, illustrating the Bragg planes recorded across the depth of the holographic film. The filter 40 is recorded with two series of Bragg planes denoted respectively by the continuous and dotted lines of FIG. 4. As described above, this will allow the filter to act as a reflective element for two stars in a pattern to be recognised. Achromatisation is achieved by creating a gradient in the spacing of the Bragg planes for each series across the depth of the element (i.e. the holographic element 40 is chirped). This ensures that the element will reflect and allow to be brought to a common focus the multiple wavelengths present in the starlight (rather than just a single wavelength), thereby providing a stronger and more localised output signal at the detector.

The holographic element 40 reflects incident light which satisfies the Bragg condition:

$$2d_i(z).\sin \theta_i = \lambda_k$$

Where $d_i(z)$ is the spatial period of the grating at depth z of the $i^{th}$ plane wave grating (there being, as discussed above, one such grating for each star in the pattern to be recognised), $\theta_i$ is the incident angle of the ith plane wave (i.e. particular star wavefront) illuminating the hologram, and $\lambda_k$ are the multiple illumination wavelengths incident on the filter originating from the stellar sources.

As can be seen from this equation, by creating a gradient in the spatial periods, the Bragg condition will be satisfied for multiple wavelengths, allowing the holographic element 40 to function as a mirror-like element. Recording many such differently oriented Bragg plane gradients on the hologram, creates appropriate "mirrors" for each star in the pattern to be recognised.

The gradient of the spacing of the Bragg planes can be achieved, e.g., by appropriate chemical processing and temperature control (e.g. in relation to the temperature of the dehydrating agent in the final processing) of the holographic film.

A plurality of sets of series of Bragg planes, each matching a different star pattern may be spatially or angularly multiplexed on the same holographic element 40 at different spatial or angular positions, to allow the same element to be used to recognise multiple different star patterns (e.g. by directing the incident light onto different parts of the element and/or at different angles to the element).

The holographic element 40 could also be arranged to focus its output onto the detector 18, thereby eliminating the need for the lens 46 (and, if desired, the mirror 44) and allowing the focussed output signal to be produced by a single optical element. This could be achieved by recording the hologram with a spherical or converging, rather than a plane, reference wave.

As well as a reflection volume phase hologram of the reference star pattern as discussed above, it would also be possible to use a transmission volume phase hologram that similarly produces multiple overlapping images at the detector. In such an arrangement, as is known in the art, the Bragg planes within the volume transmission hologram would be at an angle to the plane of the hologram and the incident light would come in at an angle and diffract from the grating planes so as to propagate through the hologram and emerge on the other side of the hologram in a direction governed by Bragg's law of diffraction.

Using a holographic element as the matched filter has the advantage that the filter arrangement can be very compact and light-weight.

It is also possible when using a holographic optical element for the filter to construct the element so that it is rotationally invariant, i.e. such that the target star pattern may be recognised regardless of the relative rotational orientation of the filter arrangement, for any given or for each star pattern the element can recognise. In this case, a rotationally invariant mask, such as the one illustrated in FIG. 5, is used to record the hologram.

Figure 5:
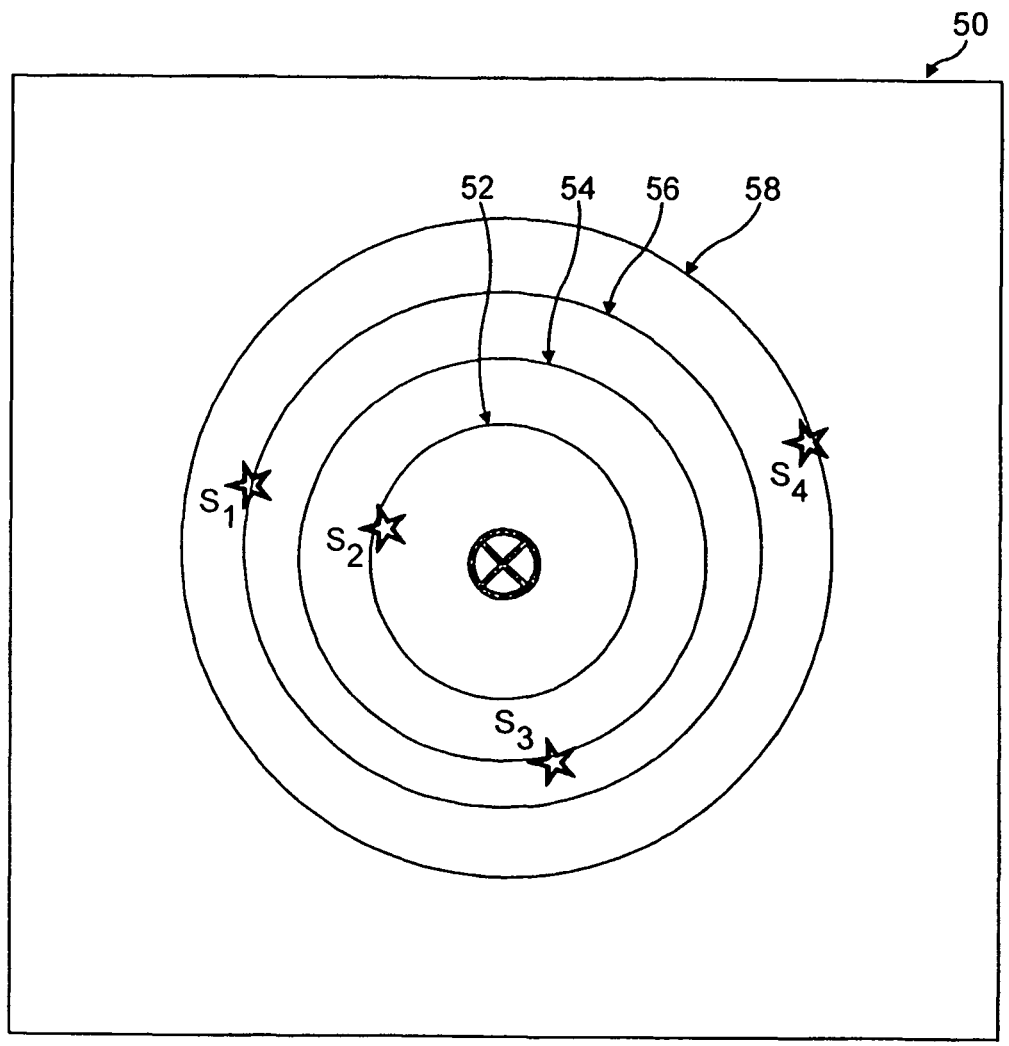
FIG. 5 shows a mask which may be used to record a rotationally invariant holographic filter in accordance with a further embodiment of the present invention.

In the mask of FIG. 5, the series of concentric circles 52, 54, 56 and 58 represent the position of each star S1, S2, S3, S4 of a star pattern to be recognised at any possible rotation about the common centre point 0 of the circles. An identifiable output will be obtained when the spacing of the circles 52, 54, 56, 58 from their common centre 0 matches the displacement of a group of stars from a given centre point in the region of the sky which is being scanned. In this way, the holographic filter element is rotationally invariant.

In this arrangement recognition results from matching the relative spacing of the circles from their common centre to the corresponding displacements of stars from the chosen centre point (defined in the template used to make the hologram) in the star field being analysed. This type of filter arrangement is inherently shift-invariant and thus allows both recognition of a given star pattern and determination of its location, albeit in a less reliable manner than a system based on individual star positions and relative rotation (since there would be, for example, more scope for different star patterns matching the rotationally invariant filter).

However, a rotationally invariant filter arrangement would allow rapid scans of large sky areas to be carried out to at least identify candidate sky regions independent of the relative in-plane rotation of the filter arrangement and star field. Once candidate sky regions have been located using the rotationally invariant filter, those regions could then be confirmed (or negated) with higher certainty, and the relative in-plane rotation, etc., determined, by using a rotationally sensitive filter arrangement as described with reference to FIGS. 1 to 3 above. Combining the two filter arrangements in this way would allow large regions of the sky to be rapidly scanned and candidate regions identified for subsequent checking with a more accurate filter arrangement.

Thus, in a preferred arrangement, a rotationally invariant holographic filter of this type is used to provide a rough estimation of the location of a star pattern, with a second filter of the type described with reference to the embodiments of FIGS. 1 to 3 then being used to provide more accurate determination.

The field of view of the pattern recognition system can be selected as desired. It has been found that a range up to 6° field of view is most suitable. For example, a field of view of approximately 6 degrees by 6 degrees can be obtained by using a CCD camera of size 512×512 pixels as the detector and a lens of f-number=2 (e.g. diameter D=25 mm and focal length F=50 mm). A suitable aperture size in front of the filter arrangement is 10 cm diameter.

It should be appreciated that in any of the embodiments described, the focusing and/or transforming lenses positioned after the filter arrangement may be combined with the filter in a single optical element. For example, in the embodiment of FIGS. 1 and 2, the mirror array 12 may comprise parabolic or spherical mirrors which will focus as well as redirect light incident upon them. As discussed above, where a holographic filter element is used, the element may be recorded using a converging reference wave so as to produce an element which also has a focusing effect.

Although the present invention has been described with particular reference to star tracking applications and indeed is particularly suited to star tracking applications, it can be used for other optical pattern recognition, particularly where the pattern to be recognised is similar to a star field, i.e. comprises relatively isolated point light sources against a relatively uncluttered background.

Thus, for example, the system could be used to recognise as well as a star field, a close juxtaposition of planets that a satellite or spacecraft could point towards. In such an arrangement, the planets may not be perfect point sources but may be extended and so could be imaged at the detector as extended regions. The overlap of the common point on the detector may not therefore be as precise as for a star field, and there may therefore be a corresponding loss of accuracy in both locating the peak and determining when the in-plane rotation was matched. It may also be the case that the probability of multiple overlaps off-axis would also increase. However, the system would still be able to provide some form of pattern recognition, albeit possibly at lower accuracy. It would also be possible to use, for example, sub-pixel interpolation techniques to improve the accuracy, although that would involve some numerical post-processing which may be undesirable.

Another application to which the present invention could be applied could be, for example, spacecraft docking. Such docking usually requires the accurate tracking of fiducial points on the spacecraft on which docking is desired. The fiducial points could be provided in the form of a pattern of point sources produced, for example, by multiple laser or light emitting diode (LED) sources. The pattern of point sources could be recognised and located by a pattern recognition system in accordance with the present invention mounted on the docking spacecraft. The correlation peak location on the detector could, for example, provide a directional signal to an automatic guidance system. Alternatively, the pattern recognition system could be mounted on the spacecraft being docked to (i.e. on which the docking manoeuvre is being made), in which case a control signal may be generated in response to the output of the pattern recognition system and transmitted to the docking spacecraft.

One difficulty with this system would be that as the docking craft approaches, the scale of the pattern being tracked will change. This could be compensated for either by using a scale-invariant filter or by applying a compensating multiple tilt to each mirror of the multiple mirror array acting as the filter as the distance to the target changes. Furthermore, on close approach, some degree of re-focussing to maintain the correlation peak's sharpness at the detector may be required, since the light emanating from the individual point sources may no longer be adequately approximated as plane waves at shorter distances (i.e. the point sources will no longer give rise to angled plane waves at the sensor aperture) and the image plane would move away from the lens as the object distance moves in from infinity. The amount of de-focus could be measured and used to determine distance, and/or, the rate de-focus could be used to determine rate of approach.

It can be seen from the above that the present invention, particularly its preferred embodiments, provides an optical pattern recognition system, and in particular an optical star pattern recognition system that can have a relatively low mass and volume, can operate autonomously, can have enhanced reliability and survivability in a space environment, can have greater ease of manufacture and hence a lower cost, can have greater versatility and multifunctionality, and faster update rates and lower computer processing requirements than existing conventional pattern recognition systems.

In particular, a pattern recognition system in accordance with the present invention can be inherently simple and therefore designed to relatively low volume, mass and cost. Particularly with a programmable mirror array, it can be arranged to have full 4Π steradian coverage without burdening computer processing requirements and therefore can provide greater autonomy. As the pattern matching is performed optically, it can be performed rapidly and without the need for extensive digital electronic computing power and electronic sub-components (which means that overall power consumption can be low and complexity can be reduced). The use of passive optical components means that the system can have greater tolerance in the harsh radiation environments encountered in space applications. Furthermore, the pattern recognition technique can be realised in real time and other than in relation to the construction of the filter arrangement, there is no in use penalty when using a large number of guide stars for identification (which can provide greater accuracy).

The invention claimed is:

1. An optical pattern recognition system, comprising:
an optical filter arrangement for receiving an optical input comprising an input scene and for providing an optical output in response to the optical input;
and a detector for detecting the output of the optical filter arrangement;
wherein:
the optical filter arrangement comprises a plurality of reflective surfaces that are or can be arranged to be tilted relative to one another for producing a plurality of images of the input scene that can be brought to a common focus at the detector; and
wherein the optical filter arrangement is arrangeable to provide an identifiable optical output when an input scene containing a predetermined pattern that the optical filter arrangement is set up to recognise is input appropriately to the optical filter arrangement, the identifiable optical output of the filter arrangement comprises a light intensity peak.

2. The system of claim 1, wherein the reflective surfaces are arranged in an array.

3. The system of claim 2, wherein each reflective surface is independently tiltable about two axes of rotation.

4. The system of claim 1, wherein the reflective surfaces comprise mirror elements.

5. The system of claim 1, wherein said optical filter arrangement comprises a holographic element comprising plural sets of series of similarly orientated Bragg planes arranged through its depth, with each set of Bragg planes having, or being capable of being arranged to have, a different orientation with respect to other sets of Bragg planes, for producing a plurality of images of the input scene that can be brought to a common focus at the detector.

6. The system of claim 5, wherein each set of Bragg planes has a gradient in the relative spacing of the Bragg planes in the set through the depth of the holographic element.

7. The system of claim 1, wherein the optical filter arrangement is arrangeable to recognise a plurality of different predetermined patterns.

8. The system of claim 7, wherein the filter arrangement is adjustable in use to allow recognition of different patterns.

9. The system of claim 7, wherein the filter arrangement is programmable in use to allow recognition of a plurality of different predetermined patterns.

10. The system of claim 7, wherein said reflective elements are movable relative to one another in use to allow recognition of a plurality of different predetermined patterns.

11. The system of claim 7, wherein the filter arrangement comprises a single filter construction capable of recognising a plurality of different patterns.

12. The system of claim 5, wherein said optical filter arrangement comprises a holographic element comprising a plurality of sets of series of similarly orientated Bragg planes recorded at different angular or spatial locations in the element to allow a plurality of different predetermined patterns to be recognised.

13. The system of claim 1, wherein the input scene has a frequency plane and the optical filter arrangement is a phase modulator in the frequency plane of the input scene.

14. The system of claim 1, wherein the optical filter arrangement is arrangeable to produce a plurality of mutually displaced images of the input scene, such that different parts of each respective image overlap or can be arranged to overlap at the common focus at the detector.

15. The system of claim 14, wherein the input scene is a starfield and the pattern to be recognised is a star pattern in the starfield, wherein the optical filter arrangement is arranged such that when a star pattern in the input starfield matches the predetermined pattern to be recognised by the optical filter arrangement; parts of each of the respective images of the starfield corresponding to images of different stars in the star pattern to be recognised overlap at the common focus of the detector.

16. The system of claim 1, wherein each of said plurality of reflective surfaces is arrangeable to provide one image of the input scene.

17. The system of claim 1, wherein the filter arrangement has an optical axis and a rotational orientation about the optical axis relative to the input scene, and wherein the filter arrangement provides the identifiable output in response to the presence of the predetermined pattern to be recognised in the input scene regardless of the rotational orientation of the filter arrangement about the optical axis of the filter arrangement relative to the input scene.

18. The system of claim 1, wherein the filter arrangement has an optical axis and a rotational orientation about the optical axis relative to the input scene, and wherein the filter arrangement provides the identifiable output in response to the presence of the predetermined pattern to be recognised in the input scene only when the input scene is at a particular rotational orientation with respect to the optical filter arrangement about the optical axis of the filter arrangement.

19. The system of claim 18, wherein the optical filter arrangement is rotatable about its optical axis relative to the input scene.

20. The system of claim 19, wherein the optical filter arrangement is mounted in a spacecraft or satellite having a major rotational axis and wherein the filter arrangement is mounted such that its optical axis coincides with the major rotational axis of the spacecraft or satellite.

21. The system of claim 1, further comprising a processor for measuring the position on the detector relative to a reference position on the detector of a detected output intensity peak.

22. The system of claim 1, further comprising a processor for assessing the intensity of the detected output peak and a processor for determining whether the predetermined pattern is present in the input scene on the basis of the assessed intensity.

23. The system of claim 1, wherein the optical filter arrangement is achromatic.

24. The system of claim 1, further comprising a plurality of detectors.

25. The system of claim 24, comprising a first detector with a relatively large field of view and a second detector with a narrower field of view.

26. The system of claim 1, wherein the filter arrangement has a field of view and the system further comprises an aperture arranged in front of the filter arrangement to restrict the field of view of the filter arrangement.

27. The system of claim 1, wherein said input scene is a starfield and said predetermined pattern is a star pattern.

28. An optical pattern recognition method, comprising inputting a scene to be analysed onto an optical filter arrangement arranged to provide an identifiable optical output when an input scene containing a predetermined pattern that the filter arrangement is set up to recognise is input appropriately to the filter arrangement, the identifiable optical output comprises a light intensity peak; wherein the optical filter arrangement comprises a plurality of reflective surfaces, said reflective surfaces being tilted relative to one another for producing a plurality of images of the input scene that can be brought to a common focus at a detector, and focussing the images produced by the reflective surfaces onto a detector.

29. The method of claim 28, wherein the reflective surfaces comprise mirror elements.

30. The method of claim 28, wherein said optical filter arrangement comprises a holographic element having plural sets of series of similarly orientated Bragg planes arranged through its depth with each set of Bragg planes having a different orientation with respect to other sets of Bragg planes for producing said plurality of images of the input scene.

31. The method of claim 28, further comprising assessing the intensity of the detected output to determine whether the predetermined pattern is present in said input scene.

32. The method of claim 28, wherein the input scene has a frequency plane and further comprising the step of arranging the optical filter arrangement to act as a phase modulator in the frequency plane of the input scene.

33. The method of claim 28, wherein the optical filter arrangement has a field of view and further comprising arranging the optical filter arrangement such that it forms a plurality of images of the input scene lying within its field of view that can brought to a common focus at the detector.

34. The method of claim 33, wherein the input scene is a starfield and the pattern to be recognised is a star pattern, further comprising arranging the optical filter arrangement such that when a pattern in the input starfield matches the predetermined pattern to be recognised by the filter arrangement, parts of each of the respective images of the starfield corresponding to images of different stars in the star pattern to be recognised overlap at the common focus of the detector.

35. The method of claim 28, further comprising arranging the filter arrangement such that it produces a plurality of mutually displaced images of the input scene.

36. The method of claim 28, further comprising rotating the optical filter arrangement relative to the input scene.

37. The method of claim 28, wherein the optical filter has an optical axis and further comprising mounting the optical filter arrangement in a spacecraft or satellite having a major rotational axis, and positioning the optical filter arrangement such that its optical axis coincides with the major rotational axis of the spacecraft or satellite.

38. The method of claim 28, comprising detecting the output of the filter arrangement on a detector, and determining the position of a detected output light intensity peak on the detector relative to a reference position on the detector.

39. The method of claim 38, wherein the filter arrangement has an optical axis, and further comprising using the position of the detected peak to determine the pointing direction of the optical axis of the optical filter arrangement relative to the pattern being recognised.

40. The method of claim 28, further comprising using the optical filter arrangement to recognise a plurality of different predetermined patterns.

41. The method of claim 40, wherein the optical filter arrangement is able to recognise only one pattern at any one time, and further comprising adjusting the filter arrangement in use to recognise different patterns.

42. The method of claim 40, further comprising programming the optical filter to allow recognition of a plurality of different predetermined patterns.

43. The method of claim 40, further comprising arranging the relative tilt of said reflective surfaces to allow recognition of a first predetermined pattern in the input scene, and adjusting the relative tilt of said surfaces to allow recognition of a second different predetermined pattern.

44. The method of claim 40, wherein the optical filter arrangement comprises a single filter construction capable of recognising a plurality of different patterns.

45. The method of claim 28, wherein the filter arrangement has a field of view and further comprising providing an aperture in front of the filter arrangement to restrict the field of view of the input scene available to the filter arrangement.

46. The method of claim 28, wherein said input scene is a starfield and said predetermined pattern is a star pattern.

47. One or more processor readable storage devices having processor readable code embodied on said processor readable storage devices, said process readable code for programming said one or more processors to perform an optical pattern recognition method comprising:
  inputting a scene to be analysed onto an optical filter arrangement arranged to provide an identifiable optical output when an input scene containing a predetermined pattern that the filter arrangement is set up to recognise is input appropriately to the filter arrangement, the identifiable optical output comprises a light intensity peak; wherein the optical filter arrangement comprises a plurality of reflective surfaces, said reflective surfaces being tilted relative to one another for producing a plurality of images of the input scene that can be brought to a common focus at a detector, and focusing the images produced by the reflective surfaces onto a detector.

48. The system of claim 1, further comprising:
  one or more processors for assessing intensity of a detected output peak and for determining whether the predetermined pattern is present in the input scene on the basis of the assessed intensity.

49. The method of claim 28, further comprising:
  determining intensity of the images focused on the detector and determining whether the predetermined pattern is present in the input scene based on the determined intensity.

* * * * *